(12) United States Patent
Fisher

(10) Patent No.: US 7,350,207 B2
(45) Date of Patent: Mar. 25, 2008

(54) RULE-BASED SYSTEM AND METHOD FOR DOWNLOADING COMPUTER SOFTWARE OVER A NETWORK

(75) Inventor: Matthew D. Fisher, Manassas, VA (US)

(73) Assignee: Tellabs Operations, Inc., Naperville, IL (US)

( * ) Notice: Subject to any disclaimer, the term of this patent is extended or adjusted under 35 U.S.C. 154(b) by 874 days.

(21) Appl. No.: 10/153,952

(22) Filed: May 23, 2002

(65) Prior Publication Data

US 2003/0088684 A1 May 8, 2003

Related U.S. Application Data

(60) Provisional application No. 60/293,230, filed on May 25, 2001, provisional application No. 60/293,178, filed on May 25, 2001.

(51) Int. Cl.
*G06F 9/445* (2006.01)
(52) U.S. Cl. .................. 717/178; 717/168; 717/172; 717/173; 717/174; 717/177
(58) Field of Classification Search ........ 709/203–224, 709/236; 717/126–176, 178; 713/100; 345/753
See application file for complete search history.

(56) References Cited

U.S. PATENT DOCUMENTS

| | | | |
|---|---|---|---|
| 5,832,275 A | | 11/1998 | Olds |
| 5,867,714 A | | 2/1999 | Todd et al. |
| 5,901,320 A | * | 5/1999 | Takahashi et al. ........... 717/170 |
| 6,247,128 B1 | * | 6/2001 | Fisher et al. ................ 713/100 |
| 6,286,051 B1 | * | 9/2001 | Becker et al. .............. 709/236 |
| 6,341,373 B1 | | 1/2002 | Shaw |
| 6,550,057 B1 | * | 4/2003 | Bowman-Amuah ......... 717/126 |
| 6,557,100 B1 | * | 4/2003 | Knutson ...................... 713/100 |
| 6,802,054 B2 | * | 10/2004 | Faraj ........................... 717/128 |
| 7,222,341 B2 | * | 5/2007 | Forbes et al. ................ 717/170 |
| 2002/0021307 A1 | * | 2/2002 | Glenn et al. ................ 345/753 |

(Continued)

OTHER PUBLICATIONS

Notification of Transmittal of the International Search Report or the Declaration (from PCT counterpart application) dated Sep. 5, 2002.

(Continued)

*Primary Examiner*—Meng-Al T. An
*Assistant Examiner*—Mark P. Francis
(74) *Attorney, Agent, or Firm*—Welsh & Katz, Ltd.

(57) ABSTRACT

The apparatus, system, and method facilitates the replacement of software components. New versions of software components and files may be transmitted to a computer system for purposes of updating the existing software components and files on that computer system. Automatic updating systems, as are currently known in the art, may however, create problems in the receiving computer system if the transmitted software components or files are corrupt or are incompatible with the software already installed on the receiving computer. The apparatus includes a data construct that, when appended to a software component or file for transmission through a communications network, facilitates the detection of transmission errors and of system incompatibilities. This construct (trailer) includes compatibility tags for use with a rule engine or other apparatus to guarantee a software component's ability to coexist with other components within the receiving computer system. In addition, multiple hierarchical CRCs (cyclic redundancy checks) are used to verify data integrity.

3 Claims, 4 Drawing Sheets

U.S. PATENT DOCUMENTS

| | | | |
|---|---|---|---|
| 2002/0073415 A1 | 6/2002 | Kim et al. | |
| 2002/0087962 A1 | 7/2002 | Hudson et al. | |
| 2002/0104080 A1* | 8/2002 | Woodard et al. | 717/176 |
| 2002/0144248 A1* | 10/2002 | Forbes et al. | 717/167 |
| 2003/0051026 A1* | 3/2003 | Carter et al. | 709/224 |
| 2004/0015952 A1* | 1/2004 | Lajoie et al. | 717/171 |
| 2004/0034686 A1* | 2/2004 | Guthrie | 709/203 |

OTHER PUBLICATIONS

International Standard; ISO/IEC 3309, Fifth edition Dec. 15, 1993; Information technology—Telecommunications and information exchange between systems—High-level data link control (HDLC) procedures—Frame structure; pp. ii-iv; 1-8.

Telcordia Technologies; Performance from Experience; Application of Software management OSI Information Model to Software Download and Memory Restoration; Issue 3, Nov. 1999; pp. 2-1-2-4; 3-1-3-4.

Library of Congress Cataloging in Publication Data; Tanenbaum, Andrew S. 1944—; Computer networks/Andrew S. Tanenbaum—3rd ed. p. cm.; pp. 182, 187, 188, 189, 190, 191.

Encoder—SRS Home/Front Page/Monthly Issue/Index; Motorola's S-Record; pp. 1-3; http://www.seattlerobotics.org/encoder/jun99/dougl.html.

IEE/ACM Transactions on Networking. vol. 6, No. 5, Oct. 1998; Performance of Checksums and CRC's over Real Data; 1063-6692/98$10.00 © 1998 IEEE.

Building Custom Rule Engines; (originally published in PC AI magazine, vol. 10, No. 2 Mar./Apr. 1996) pp. 1-12.

* cited by examiner

FIG. 2

| # | Field | Description |
|---|---|---|
| 201 | PN[0:7] | PAYLOAD NUMBER (LSB) |
| 203 | PN[8:15] | PAYLOAD NUMBER |
| 205 | PN[16:23] | PAYLOAD NUMBER |
| 207 | PN[24:31] | PAYLOAD NUMBER (MSB) |
| 209 | SCT 1[0:7] | ⎫ |
| 211 | SCT 1[8:15] | |
| 213 | SCT 1[16:23] | |
| 215 | SCT 1[24:31] | FIRST SOFTWARE |
| 217 | SCT 1[32:39] | COMPATIBILITY TAG |
| 219 | SCT 1[40:47] | |
| 221 | SCT 1[48:55] | |
| 223 | SCT 1[56:63] | ⎭ |
|  | ⋮ |  |
| 225 | SCT n[0:7] | ⎫ |
| 227 | SCT n[8:15] | |
| 229 | SCT n[16:23] | |
| 231 | SCT n[24:31] | |
| 233 | SCT n[32:39] | nth SOFTWARE COMPATIBILITY TAG |
| 235 | SCT n[40:47] | |
| 237 | SCT n[48:55] | |
| 239 | SCT n[56:63] | ⎭ |
| 245 OVR / 246 VER / SCTS[0:5] 249 | | OVERRIDE, VERSION SCT SIZE(LSB) |
| 251 SCTS[6:11] / 253 PV[0:1] | | SCT SIZE (MSB), PAYLOAD VERSION (LSB) |
| 255 | PV[2:9] | PAYLOAD VERSION |
| 257 | PV[10:17] | PAYLOAD VERSION |
| 259 | PV[18:25] | |
| 261 | PCS[0:7] | PAYLOAD CRC(LSB) |
| 263 | PCS[8:15] | PAYLOAD CRC |
| 265 | PCS[16:23] | PAYLOAD CRC |
| 267 | PCS[24:31] | PAYLOAD CRC(MSB) |
| 269 | PTCS[0:7] | PAYLOAD AND TRAILOR CRC(LSB) |
| 271 | PTCS[8:15] | PAYLOAD AND TRAILOR CRC |
| 273 | PTCS[16:23] | PAYLOAD AND TRAILOR CRC |
| 275 | PTCS[24:31] | PAYLOAD AND TRAILOR CRC (MSB) |

1 BYTE

RULE-BASED SYSTEM AND METHOD FOR DOWNLOADING COMPUTER SOFTWARE OVER A NETWORK

CROSS-REFERENCE TO RELATED APPLICATIONS

This application claims the benefit of U.S. Provisional Application Ser. No. 60/293,178 filed May 25, 2001 and Provisional Application Ser. No. 60/293,230 filed May 25, 2001.

FIELD OF THE INVENTION

The present invention generally relates to downloading software over a network to a target element. In particular, this invention provides means for verifying compatibility and data integrity of software to be installed at a target element.

BACKGROUND

It is well known in the prior art to download computer software to a target element in a network in order to upgrade or replace existing software or to replace faulty software. However, current software downloading models either do not adequately address software and hardware compatibility and data integrity issues, or address them in a costly manner. In the former case, software may be downloaded over a network without checking compatibility, and by relying on network protocols to ensure data integrity. These protocols, typically conducted at a packet level, provide a limited degree of assurance that no corrupted data has been transmitted.

Indeed, in some cases, network-level reliability checks are not required. This may be satisfactory in single-instance cases where the user already knows that the software to be downloaded is compatible with software and hardware at the target, and where the user does not mind resending the software if the software is corrupted during transmission.

If the software is not corrupted in the transmission process, or if any corruption that occurs is detected and corrected through the reliability checks built into the network, the software may arrive at the target in an uncorrupted state; and if it is compatible with software at the target element, then it will function properly after it has been downloaded. In other cases, however, especially where the software is to be downloaded at a multiplicity of targets, each having particular software and hardware compatibility issues, there is a need to take additional measures to ensure compatibility and data integrity.

Accordingly, an inexpensive and reliable means of installing, replacing or upgrading software at a target element over a network is needed.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, in the several figures of which like reference numerals identify like elements, and in which:

FIG. 2 shows the structure of a data trailer of an embodiment;

DETAILED DESCRIPTION

Figure 1:
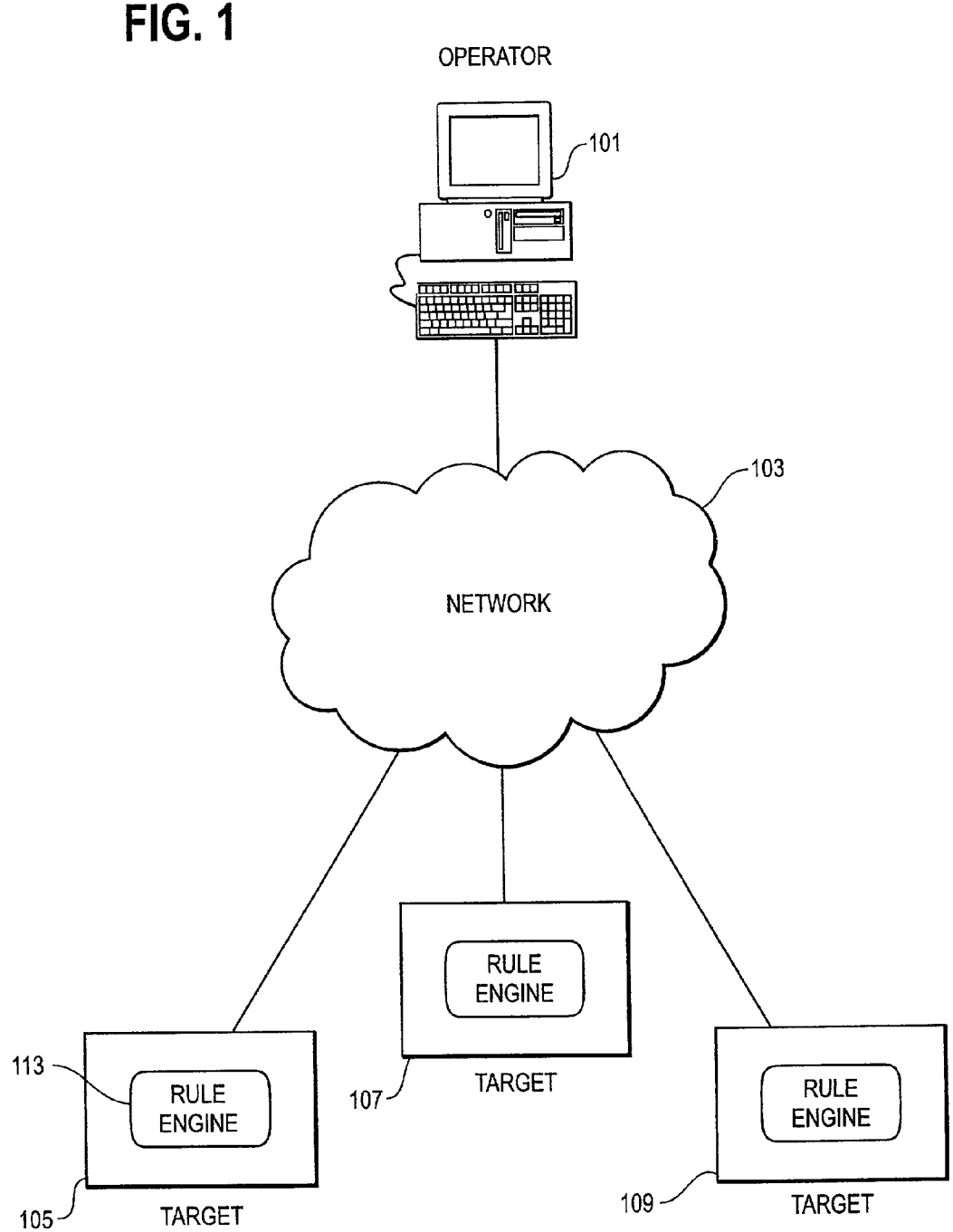
FIG. 1 shows a network having a sending element and a plurality of target elements, in which the principles of this invention may be practiced.

Embodiments of the present invention provide an inexpensive and reliable method for installing software over a network to a network element, and also provide an inexpensive and reliable method for upgrading installed software components on a network. Embodiments of the present invention also increase the reliability of data transmission over a network. Greater data transfer reliability is achieved through use of a nested-CRC (Cyclic Redundancy Check) approach.

According to an embodiment of the present invention a data trailer is provided that is capable of containing software compatibility tags with maximum flexibility in terms of number of tags, size of tags, and format of data within the tags. Furthermore, according to an embodiment of the present invention a data trailer is provided that is not dependent on the data payload, and thus can be used in any type of data, including encrypted and non-encrypted data, and proprietary and open encodings. An embodiment of the present invention uses a rule-based approach for compatibility testing for a software installation procedure. This rule-based approach to compatibility testing facilitates evaluating complex expressions that can vary widely from target to target.

Embodiments of the present invention provide reliable, efficient means for installing software sent from one node of a network to another node in the network, without corruption, and with compatibility with existing software or hardware. Specifically, the embodiments provide a method for providing downloadable software from a sending element to a target element comprising (1) providing a data unit comprising a payload and a data trailer; (2) storing a software program constituent in the payload; (3) storing at least one software compatibility tag in the data trailer, each software compatibility tag containing at least one software compatibility tag rule associated with the software compatibility tag, and each software compatibility tag containing information specific to the software program in the data trailer; and (4) transmitting the data unit to a target element, the target element having information specific to software located at the target element, and the target element evaluating the software compatibility tag rule.

In one embodiment, an application at the target element evaluates the software compatibility tag rule and determines, based on the rule, whether to install the payload to the target element. Specific embodiments include an indicator, provided in the data trailer, of whether the at least one software compatibility tag rule should be evaluated, and an indicator, in the software compatibility tag, of whether a software compatibility tag rule associated with the software compatibility tag should be evaluated. A data unit sent in accordance with one embodiment further comprises two reliability checking parameters in the data trailer, where one such parameter is associated exclusively with the data in the payload, and the other such parameter is associated with the data unit as a whole.

In another embodiment, a data unit containing the contents of the above-described data trailer but without a payload is sent to a target element for evaluation of the rules of any SCTs in the data trailer. If the rules evaluate satisfactorily, then a signal is sent to the sending element, which prompts the sending element to send a data unit containing the payload for installation at the target element.

The following defined terms are used in the present description.

"Checksum" is defined as a means for checking reliability of a data transmission that includes both checksums and cyclical redundancy checks, as those terms are understood by those with skill in the art.

"Data unit" refers to data that is sent over a network according to an embodiment of the present invention, and typically comprises a payload portion and a data trailer. The payload portion typically contains one or more files, which may be compressed.

"Package," as used herein, can be synonymous with "data unit" and thus in some usages refers to a file or set of files that are associated with a data trailer, but can also refer to a file or set of files without regard to whether the file or files are associated with a data trailer.

"Install," "installation" as used herein refers to installing, replacing, upgrading, updating, or running software (as defined herein) at a target element.

"Software," as used herein, refers to executable software computer programs, as well as files without any executable components, such as data files.

"Data trailer," as used herein, refers to any data trailer that can be populated with checksums and/or SCTs, and is not to be construed as limited to the specific embodiments of data trailers discussed herein.

"Software Compatibility Tag," or "SCT," as used herein, refers to any SCT that can be populated with identifying information (such as a part number) and rules for comparing the identifying information to like information external to the SCT, and is not to be construed as limited to the specific embodiments of SCTs described herein.

FIG. 1 shows a network such as can beneficially employ the system of this invention for installing computer software. The system includes sending element 101, typically a component of or a plug-in to network 103, target elements 105, 107, and 109, all coupled to the network, and rule engines 113 associated with each target element. The sending element 101 is typically a computer operated by a user, but can also be an automated server that requests packages automatically or a computer that is operated by a remote user. The data to be sent over the network can comprise a single file or a plurality of files, which may be compressed.

In one embodiment, each data unit is provided with a data trailer in accordance with the present invention, where the data trailer typically includes a checksum that covers the entire data unit (including both data trailer and payload), as well as a checksum that covers only the payload. In one embodiment, the aforementioned checksums are Cyclical Redundancy Checks (CRCs). The data trailer also may contain one or more software compatibility tags, as described herein. The data unit, including the data trailer, is sent over network 103 to be installed at any or all of target elements 105, 107, and 109. At the receiving target element, software installed at the target element receives the incoming software and evaluates the checksums for corruption, and, using rule engine 113, evaluates the rules provided in the software compatibility tags to determine compatibility. These steps are treated in more detail in the discussion of FIGS. 2-4.

As shown in FIG. 1, rule engine 113 has information about the target element that can be used to assess compatibility by comparing it to information regarding the incoming software contained in the software compatibility tag. Typically, as in the embodiments discussed below, the information comprises part number and version number information. If the rule engine determines that the incoming software is compatible with software and hardware at the target, it is installed at the target. If a target is replacing its existing software with a package's payload, it overwrites the existing software load with the new software and hence upgrades itself FIG. 2 depicts an exemplary data trailer 200, which may be included as part of a package of software to be transmitted to a target element, where it will be read and executed. It will be appreciated by those with skill in the art that the size of the data trailer 200, or the size or location of any or all of its constituents, can vary from that depicted in FIG. 2 and still perform its function in accordance with this invention.

As shown in FIG. 2, part number fields 201, 203, 205, and 207 are each 8-bit (one byte) fields that can be used to contain a part number associated with the software to be sent in the payload or software or hardware at a target element. However, a user can elect to place other data in this field.

In the embodiment of FIG. 2, fields 209-223 are dedicated to one 64-bit (8 byte) Software Compatibility Tag (SCT). As shown, the data trailer 200 may contain any number n of SCTs. An SCT contains information regarding the payload of the package that will enable a rule engine at a target element to determine whether the software in the package is compatible with software and hardware existing at the target element. SCTs are discussed in more detail in connection with FIG. 3.

In the embodiment of FIG. 2, field 245, consisting of one bit, is used to serve an override function. The Override bit (OVR) allows a network element to ignore the SCT data and to install the payload directly. The OVR bit may be set to "override" if, for example, multiple packages need to be installed subsequent to each other, but have compatibility rules that are only applicable after all of the packages have been installed. The possible values of the OVR bit in one embodiment of the invention are shown in Table 1.

TABLE 1

OVR Field

| Value | Description |
| --- | --- |
| 0 | Utilize SCT bytes for compatibility resolution. |
| 1 | Ignore all SCT bytes. |

In the embodiment depicted in FIG. 2, field 246 contains a bit that identifies the version number of the trailer layout. In the depicted embodiment, the VER field is a single bit that can be set to indicate either an initial value or a future value. Thus, the VER field contemplates future upgrades to the trailer layout. If the VER submitted with a software package is recognized by the target element to be an outdated version of the software package, the target element will not permit the installation to occur. The possible values of the VER bit in one embodiment of the invention are shown in Table 2, although it will be recognized by those with skill in the art that additional bits could be used to differentiate between different version numbers.

TABLE 2

VER Field

| Value | Description    |
|-------|----------------|
| 0     | Initial value. |
| 1     | Future value.  |

In the embodiment depicted in FIG. 2, fields 249 and 251 constitute the SCT Size (SCTS) field, which contains 12 bits that specify the number of SCTs that are contained in data trailer 200, although it will be recognized that more or fewer bits can be reserved for this purpose.

In the embodiment depicted in FIG. 2, fields 253-259 are dedicated to 26 bits that specify the version number of the payload. In general, the payload is expected to contain a single file or package, although this is not required, as the payload may consist of several files, like a compressed archive. Thus, the payload version can uniquely reference the payload's contents.

In the embodiment depicted in FIG. 2, the 32 bits of fields 261-267 constitute the Payload Checksum (PCS) field. This field provides a checksum for the payload portion of the data unit only. In a preferred embodiment, the PCS field is designed to hold a CRC-32 CRC as described in ISO 3309 (International Organization for Standardization, "Information Processing Systems—Data Communication High-Level Data Link Control Procedure—Frame Structure," ISO 3309, October 1984, 3rd Edition). Upon receipt of the data unit at a target element, the PCS CRC is analyzed to determine whether the data has been corrupted in the transmission process.

In the embodiment depicted in FIG. 2, the 32 bits of fields 269-275 constitute the Payload and Trailer Checksum. The Payload and Trailer Checksum (PTCS) covers the data in the entire data unit, including that in the trailer as well as that in the payload. Like the Payload Checksum (PCS), the PTCS can be a CRC-32 CRC as described in ISO 3309. The use of the PCS and PTCS as nested CRCs ensures a level of data integrity not attainable with the PCS or the PTCS alone. While using a single CRC gives a certain level of assurance depending on the number of bits dedicated to the CRC, the use of two CRCs in a nested arrangement results in assurance of data integrity that is proportional to the product of the probabilities of undetected transmission errors of the PCS or PTCS standing alone. As is well known in the art, if corruption is detected in a data transmission, the target element sends a signal or fails to send a signal to the sending element, which causes the sending element to resend the data.

Figure 3:
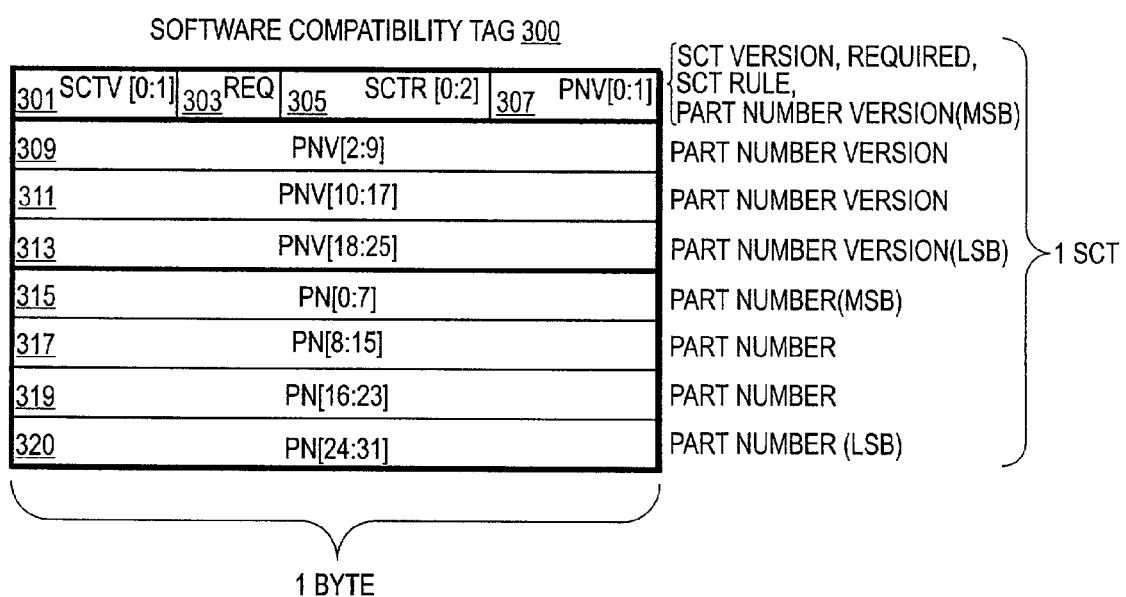
FIG. 3 shows the structure of a software compatibility tag of an embodiment.

FIG. 3 depicts a 32-bit software compatibility tag 300. In the preferred embodiment depicted in FIG. 3, SCTV field 301 comprises 2 bits that can be used to represent the SCT Version (SCTV). The SCTV represents the version of the SCT 300, that is, how the SCT 300 is formatted. For example, as described below, the various fields in the SCT 300 depicted in FIG. 3 are associated with particular functions. For a subsequent version of the SCT 300 (for example, where SCTV=11), the correspondence between fields and functions might be different. Thus, the SCTV of this exemplary embodiment can be set to represent an initial value, or one of three future values.

TABLE 3

SCTV Field

| Value | Description    |
|-------|----------------|
| 00    | Initial value. |
| 01    | Future value.  |
| 10    | Future value.  |
| 11    | Future value.  |

In the embodiment depicted in FIG. 3, Field 303 contains the Required (REQ) bit. The REQ bit tells the rule engine whether or not to assess the embedded rule. This allows the rules to be evaluated one rule at a time. This field allows the target to evaluate all the rules of a set of SCTs on a rule-by-rule basis, by providing that any SCT with 0 in this field will be skipped without causing an incorrect rule evaluation.

TABLE 4

REQ Field

| Value | Description         |
|-------|---------------------|
| 0     | Rule is not required. |
| 1     | Rule is required.     |

In the preferred embodiment depicted in FIG. 3, field 305 contains 3 bits that identify the Software Compatibility Tag Rule (SCTR) by which to compare the characteristics of incoming software with the compatibility requirements of software and hardware present at the target node. The SCTR will typically comprise a mathematical symbol for describing the relationship between two numbers, such as equal to (=), less than or equal to (<=) or greater than or equal to (>=). As demonstrated in Example 1 below, the rules of a plurality of SCTs can be set to tell the rule engine that a number (such as a part number or version number) associated with a piece of hardware or software at a target node must fall within a certain range, for compatibility with the incoming software package.

In the embodiment depicted in FIG. 3, the information contained in the SCT 300 comprises Part Number (PN) information (the 32 bits of fields 315-321) and Part Number Version (PNV) information (the 26 bits of fields 307-313). In this exemplary embodiment, PN refers to a part number assigned by a manufacturer to a given piece of software or hardware, and PNV refers to a specific version of that piece of software or hardware.

The SCTR operates by comparing Part Number and Part Number Version information relating to the incoming application to the Part Number and Part Number Version of a software or hardware component at the target node (the Part Number and Part Number Version of such a component at the target node are referred to, respectively, as the "Target Part Number" and the "Target Part Number Version"). If the Target Part Number does not match the Part Number in the SCT 300, then the rule is not evaluated. If the Target Part Number does match the Part Number in the SCT 300, then the rule is evaluated. The rules comprise a plurality of mathematical expressions, for example those in Table 5:

TABLE 5

SCTR Field

| Value | Description |
|---|---|
| 000 | Equality comparison ( == ). |
| 001 | Inequality comparison ( != ). |
| 010 | Less than comparison ( < ). |
| 011 | Less than or equality comparison ( <= ). |
| 100 | Greater than comparison ( > ). |
| 101 | Greater than or equality comparison ( >= ). |
| 110 | Unused. |
| 111 | Unused. |

Figure 4:
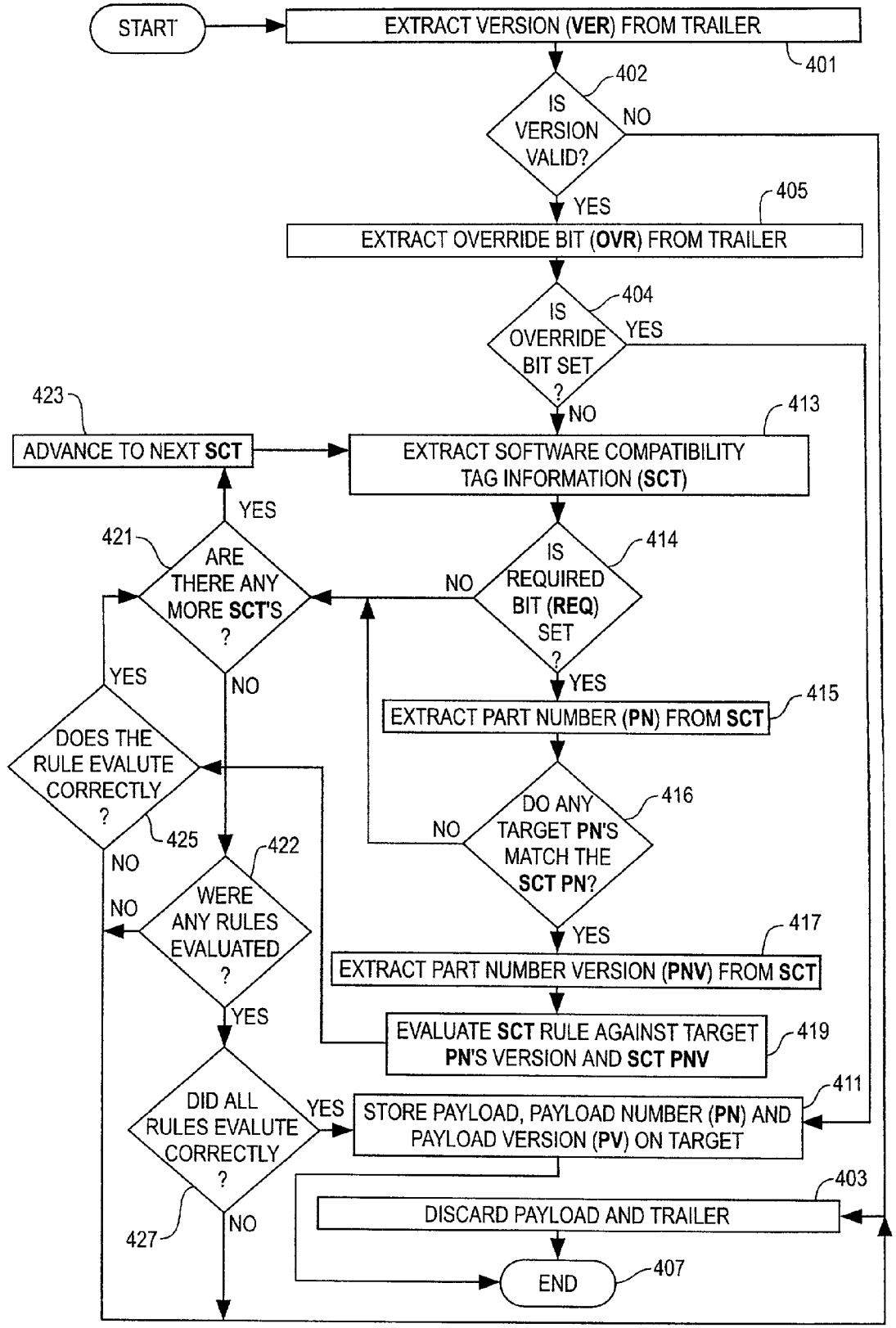
FIG. 4 shows a flow diagram of the operation of a software compatibility tag of an embodiment.

FIG. 4 is a flow diagram that provides an overall view of the operation of the target node rule engine when it receives an incoming packet containing a data. First, the application extracts the Version (VER) for the data trailer (step 401). If the version is not valid (determination made at step 402), the payload and data trailer—i.e., the entire data unit—are discarded (step 403). If the version is valid (determination made at step 402), the application extracts the Override Bit (OVR) from the trailer (step 405). If the OVR bit is set (determination made at step 404), then the Payload, Payload Part Number (PN) and Payload Version (PV) from the data trailer are installed on the target without further analysis (step 411).

If the OVR bit is not set, then the application extracts the software compatibility tag information (step 413). If the SCT Required (REQ) bit is set (determination made at step 414), the application proceeds to step 415 to extract the Part Number (PN) from the SCT (step 415). If the SCT REQ bit is not set, then the application checks to see if there are any more SCTs to be evaluated (step 421). If not, then application checks to see if any rules were evaluated (step 422). If no more SCTs remain to be evaluated, and if none of the rules have been evaluated, then the application discards the payload and trailer (step 403). If, at step 421, there are no more SCTs to be evaluated, and all the rules evaluated were evaluated correctly, then the Payload, Payload Part Number (PN) and Payload Version (PV) from the data trailer are installed on the target (step 411). If there are more SCTs to be evaluated, the application advances to the next SCT (step 423), extracts the SCT information from that SCT (step 413), and proceeds as discussed above.

Returning to step 415, if no Target Part Number matches the SCT PN, then the application checks to see if there are any more SCTs to be evaluated (step 421) and proceeds as discussed above. If any Target Part Number matches the SCT PN, the application extracts the Part Number Version (PNV) from the SCT (step 417) and then evaluates the SCT rule against the target Part Number's version and the SCT PNV (step 419). If the rule does not evaluate correctly (determination made at step 425), then the payload and trailer are discarded (step 403). If the rule does evaluate correctly, the application checks to see if there are any more SCTs to be evaluated (step 421). If there are more SCTs to be evaluated, the application advances to the next SCT (step 423) and extracts the SCT information from that SCT (step 413), and proceeds as described above. If there are no more SCTs to be evaluated, and if all the rules evaluated were evaluated correctly, then the Payload, Payload Part Number (PN) and Payload Version (PV) from the data trailer are installed on the target (step 411). If the rule for any SCT did not evaluate correctly (determination made at step 427), the payload and trailer are discarded (step 403).

A specific example of the manner in which an SCT is evaluated at a target element is described in Example 1 below. A software application to be sent to a network node only works at network nodes having part number 1233 and a part number version number between 100 and 200, inclusively, and at network nodes having part number 1234 and a part number version number between 600 and 850, exclusively. The software is sent to a target node along with a data trailer containing SCTs, which contain SCT rules reflecting these requirements. In this case, four SCTs are required. Table 6 is a partial list of the contents of these SCTs:

TABLE 6

| Required Bit (REQ) | Part Number Version (PNV) | Part Number (PN) | SCT Rule (SCTR) |
|---|---|---|---|
| 1 | 100 | 1233 | >= |
| 1 | 200 | 1233 | <= |
| 1 | 600 | 1234 | > |
| 1 | 850 | 1234 | < |

When the application is sent to a node having a part number of 1234 and a version number of 777, the following evaluation of the SCTs occurs at the target node. An application at the target extracts the Required Bit from the first SCT and determines that this rule is "required" (step 414). Next, the target application extracts the part number from the first SCT and compares it to the Part Number at the target (step 416). If the part numbers do not match, the rule is disregarded. In this case, the first two rules are disregarded because the part number at the target (1234) is different from the part number specified in the SCT rule (1233). However, the remaining two SCT rules do apply, because the part number at the target (1234) matches that specified in these rules. The target application then evaluates the remaining rules by applying each rule's corresponding SCTR against its PNV and the target node's part number version (777) (steps 417, 419). Thus, the third rule evaluates to "true" because the target node's part number version is greater than the minimum PNV specified for the incoming software (600), and the fourth rule evaluates to "true" because the target node's part number version (777) is lower than the maximum PNV specified for the incoming software (800). Because both rules evaluated to true, the payload and its version would be installed locally at the target node. If either rule had evaluated to "false," the payload would have been discarded.

It will be appreciated by those with ordinary skill in the art that the above example involving hardware and a single part number can easily be extended to more complex situations, including applying the scheme to software (or a hardware/software mix) and to those targets that have multiple parts (e.g. an operating system, or a Fully Programmable Gate Array (FPGA) for an embedded chip) and multiple part numbers. In the case of multiple parts, each part would be assigned its own data trailer and its own set of SCTs. In these cases, each part would evaluate each rule independently of the other parts (N rules and M part numbers would mean N×M rule evaluations).

When a software module is ready to be deployed to some number of network elements, the module is run through an application that creates zero or more rules, and creates and attaches the trailer to the module. To use this encoding, the application must be able to convert user-supplied version data into 26-bit numbers, as dictated by the PNV field. In a preferred embodiment, the transformation from a custom versioning scheme to a 26-bit integer is accomplished as follows:
   a. Remove any delimiters
   b. Concatenate/convert the remaining values
   c. Save the value into either the PNV or PV
For example:
12.90.003 ⇒1290003 (base 10)
12/90/a ⇒129097 (base 10, using ASCII as the transformation from character to integer)

The 26-bit field for PNV enables the application to handle PNVs that have values of up to 67,108,863 ($2^{26}-1$). It is well within the ability of those with ordinary skill in the art to modify the above-described method—including by providing a field for PNV with more than 26 bits—to handle a PNV with an even greater value.

Once the module is received by a network element and the trailer is removed and analyzed, the rule engine on the target will execute the steps described in FIG. 4 as follows (all pseudocode is based on the C programming language):
1. Determine which trailer version (VER field, FIG. 2, field 246) is being used to encapsulate the SCTs and other trailer information:
   a. Open a file pointer using a call such as fopen().
   b. Move the pointer to position:
      ((size of file)−103 bits)
      using a call such as fseek().
   c. If this position (which is VER field 246 on FIG. 2) does not contain a zero, error out of the trailer evaluation procedure.
2. Examine the override bit (OVR field, FIG. 2, field 245):
   a. Move the pointer of position:
      ((size of file)−104 bits)
      using a call such as fseek().
   b. If the bit contains a value of one, skip all the remaining steps and unconditionally save the payload, the payload's PN and PV locally.
3. Loop over all the SCTs in the trailer. To determine the outer bound (ending point) of the loop, extract the SCT size (SCTS field, FIG. 2, fields 249-251) by using the same file pointer in the previous step and moving the pointer to position:
   ((size of file)−96 bits)

using a call such as fseek(). The 96 bits will place the file pointer at the beginning of the 'SCTS[6:11]' field (FIG. 2, field 251).

To begin reading from the ith SCT, move the pointer as follows:
   (size of file)−n−((s−i+1)*v)
   where:
      n=104 bytes (combined size of PTCS, PCS, PV SCTS, VER and OVR sections)
      s=value in SCT Size field
      v=64 bytes (size of a single SCT)
      i=SCT index using a call such as fseek(). This starting position will be labeled as startPtr for the remaining steps and will change for each iteration of i.
   For each SCT:
   a) Parse out the SCTV (FIG. 3, field 301), REQ (FIG. 3, field 303), SCTR (FIG. 3, field 305)as follows:
      fseek(startPtr);
      char byte=fgetc();
      int sctv=(byte & 0xC0)>>6;
      int req=(byte & 0x20)>>5;
      int sctr=(byte & 0x1C)>>2;
   b) Make sure that sctv=0.
   d. Read the req variable (FIG. 3, field 303) to decide if this rule should be evaluated or not. If the req variable is set to 0, ignore the rule and advance to the next SCT. If it is set to 1, then:
      i. Retrieve the PN from the SCT (FIG. 3, fields 315-321). This can be done with the following pseudocode:
         a. Read the next 4 bytes from the file (via fgetc() or a similar system call) and shift their values into pn:
         fseek(startptr+32 bits);
         unsigned long pn=fgetc();
         pn<<=24;
         byte=fgetc();
         pn|=(byte1<<16);
         byte=fgetc();
         pn|=(byte<<8);
         byte=fgetc();
         pn|=byte;
      ii. Retrieve all part numbers from the target node. It is not pertinent how or where these values are stored on the target, only that they can be retrieved and evaluated individually.
      iii. Compare the variablepn to each of the target's part numbers. Reject all those part numbers that do not matchpn exactly. If there is a match, then:
         a. Retrieve the PNV from the SCT (FIG. 3, fields 307-313). This can be done by using the following pseudocode:
            i. Move the file pointer back to the beginning of the SCT, parse out the two most significant bits of the PNV and shift in the remaining three bytes:
            fseek(startPtr);
            byte=fgetc();
            unsigned long pnv=byte & 0x03;
            pnv<<=30;
            byte=fgetc();
            pnv|=(byte1<<16);
            byte=fgetc();
            pnv|=(byte<<8);
            byte=fgetc();
            pnv|=byte;
         b. Retrieve the part number's corresponding version from the target node. It is not pertinent how or where the version is stored on the target, only that it can be retrieved. Assign it to variable lpnv.
         c. Evaluate the rule lpnv sctr pnv:

```
switch (sctr)
{
case 0:
    result = (lpnv == pnv);
    break;
case 1:
    result = (lpnv!= pnv);
    break;
case 2:
    result = (lpnv < pnv);
    break;
case 3:
    result = (lpnv <= pnv);
    break;
case 4:
    result = (lpnv > pnv);
    break;
case 5:
    result = (lpnv >= pnv);
    break;
}
``` i. If 'result' is 'true', then the rule passes and the rule engine continues to the next rule.

ii. If 'result' is 'false', then the rule fails, the rule engine notifies the system of the error and does not accept the software component.

4. If all the rules pass (or if the OVR is set to 1), then save the payload, the payload's PN and PV locally.

While various embodiments of the present invention have been described above, it should be understood that they have been presented by way of example only, and not limitation. For example, the location and size of the various data fields within the data trailer and SCT of the depicted embodiment are merely exemplary and do not limit the scope of the invention. It is also to be understood, of course, that the present invention in various embodiments can be implemented in hardware, software, or in combinations of hardware and software. As such, the breadth and scope of the present invention should not be limited to any of the above-described exemplary embodiments, but should be defined only in accordance with the following claims and their equivalents.

What is claimed is:

1. A method for providing downloadable software to a target element, comprising:

providing a data unit having a payload and a data trailer;

storing a software program in the payload;

storing at least one software compatibility tag in the data trailer, each software compatibility tag containing at least one software compatibility tag rule associated with the software compatibility tag, and each software compatibility tag containing information specific to the software program in the payload;

transmitting the data unit to a target element, the target element having information specific to at least one element located at the target element, and the target element having means for evaluating the software compatibility tag rule;

automatically evaluating, at the target element, the software compatibility tag rule;

determining, responsive to the rule-evaluating, whether to install the payload at the target element wherein the data trailer includes a plurality of elements selected from a class which includes part number data, at least one software compatibility tag, override data, trailer version number of trailer, number of compatibility tags, version number of payload, payload checksum, and payload and trailer checksum;

reliability checking exclusively the data in the payload, and reliability checking the data unit as a whole; and wherein the software compatibility tag contains at least one of; rule evaluation data, software compatibility tag rule data, part number information of the software program, and part number version information of the software program.

2. The method according to 1, wherein the software program constitutes a data file.

3. A method for determining compatibility of downloadable software with a target unit, comprising:

providing a data unit having at least a data trailer;

storing at least one software compatibility tag in the data trailer, each software compatibility tag containing at least one software compatibility tag rule associated with the software compatibility tag, and each software compatibility tag containing information specific to the software;

transmitting the data unit from a sending unit to a target unit;

automatically evaluating at the target unit the software compatibility tag rule in order to determine compatibility of the software with the target unit;

sending, if evaluation of the software compatibility rule indicates compatibility, a signal from the target unit to the sending unit;

sending, in response to the signal, a data unit having a payload containing the software from the sending unit to the target unit;

wherein the data trailer contains at least one of; part number data, at least one software compatibility tag, override data, trailer version number of trailer, number of compatibility tags, version number of payload, payload checksum, and payload and trailer checksum;

wherein the software compatibility tag contains at least one of; rule evaluation data, software compatibility tag rule data, part number information of the software, and part number version information of the software; and which includes conducting, at the target unit first and second different checksum evaluations prior to installing the software at the target unit.

* * * * *